United States Patent [19]

Frischmann et al.

[11] 4,234,360
[45] Nov. 18, 1980

[54] METHOD OF MAKING HYSTERESIS MOTOR ROTOR USING AMORPHOUS MAGNETIC ALLOY RIBBONS

[75] Inventors: Peter G. Frischmann, Scotia; Fred E. Luborsky, Schenectady; Russell E. Tompkins, Scotia, all of N.Y.

[73] Assignee: General Electric Company, Schenectady, N.Y.

[21] Appl. No.: 898,919

[22] Filed: Apr. 21, 1978

[51] Int. Cl.³ .............. C21D 1/04; H01F 1/00; C22B 43/00
[52] U.S. Cl. ................. 148/121; 29/596; 75/123 D; 75/123 K; 148/122
[58] Field of Search .......... 148/122, 121; 29/598, 29/596; 75/123 D, 123 K

[56] References Cited

U.S. PATENT DOCUMENTS

| | | | |
|---|---|---|---|
| 3,614,893 | 10/1971 | Nesbitt | 73/362 R |
| 3,842,268 | 10/1974 | Cornell | 250/231 SE |
| 4,053,331 | 10/1977 | Graham et al. | 148/120 |
| 4,053,333 | 10/1977 | Egami et al. | 148/120 |
| 4,056,411 | 11/1977 | Chen et al. | 148/121 |
| 4,079,430 | 3/1978 | Fujishima et al. | 360/126 |
| 4,081,298 | 3/1978 | Mendelsohn et al. | 148/121 |
| 4,116,728 | 9/1978 | Becker et al. | 148/108 |
| 4,126,287 | 11/1978 | Mendelsohn et al. | 245/8 |
| 4,134,779 | 1/1979 | Ray et al. | 148/121 |
| 4,150,981 | 4/1979 | O'Handley | 75/170 |
| 4,152,144 | 5/1979 | Hasegawa et al. | 75/122 |

FOREIGN PATENT DOCUMENTS 51-73920  6/1976  Japan ...................... 75/123 B

OTHER PUBLICATIONS

Coleman, "Crystallization . . . Metallic Glasses" Mat. Sci. & Engg. 23 (1976) 161.
Egami et al., "Amorphous Alloys . . . ", Magnetism & Magnetic Materials-1974, AIP Conf. Proc., No. 24, p. 697.

Primary Examiner—L. Dewayne Rutledge
Assistant Examiner—Upendra Roy
Attorney, Agent, or Firm—Leo I. MaLossi; James C. Davis, Jr.

[57] ABSTRACT

A magnetic alloy is cast as an amorphous metal ribbon and wound on a rotor shaft of a hysteresis motor and then heated to crystallize the metal ribbon and greatly increase its coercive force prior to assembling the rotor with the stator of the motor.

5 Claims, 4 Drawing Figures

4,234,360

METHOD OF MAKING HYSTERESIS MOTOR ROTOR USING AMORPHOUS MAGNETIC ALLOY RIBBONS

The Government has rights in this invention pursuant to Contract No. N00014-76-C-0807 awarded by the Office of Naval Research, Department of the Navy.

The present invention relates generally to the magnetic alloy art and is more particularly concerned with a novel method of making magnetic components for motors and also with the resulting new motor parts and motors incorporating them.

CROSS REFERENCE

This invention is related to the invention disclosed and claimed in our copending patent application Ser. No. 898,820 filed of even date (now abandoned) herewith entitled, "Method of Making Permanent Magnets and Product" assigned to the assignee hereof, which pertains to the concept of making a permanent magnet by forming a body of desired final shape of amorphous soft magnetic alloy and heat treating it to crystallize the metal and convert it to the hard magnetic state.

BACKGROUND OF THE INVENTION

Hysteresis motors are self-starting synchronous machines which use the hysteretic properties of their rotors, the driving force being provided by the rotating stator fields which magnetize the magnetic components of the rotors. The torque developed by the motor in each instance is proportional to the area of the hysteresis loop of the rotor magnetic component but the greater the area of hysteresis loop, the greater the coercive force and the greater the exciting current required for operation. Consequently, control of the area of the loop to meet motor design requirements is necessary. In accordance with prior art practice, that necessity is met through composition selection and burdensome special processing measures.

Another persistent problem associated with the fabrication of hysteresis motors is their material and production costs, the essential alloys (such as the commercial alloy known as P-6, the composition of which on the weight basis is 44.5 percent iron, 45.0 percent cobalt, 6.0 percent nickel and 4.5 percent vanadium) being relatively expensive and requiring repeated cold working and high temperature annealing operations.

SUMMARY OF THE INVENTION

By virtue of this invention based upon our novel concept to be described, hysteresis loop area requirements can be easily met through the use of a readily controlled process which involves only a melting step and a casting step followed by a single relatively low-temperature anneal. Moreover, the prior necessity for using expensive cobalt alloys is avoided as relatively very low-cost amorphous metal alloys are employed instead.

In essence, our new concept is to cast in ribbon form a magnetic alloy which in its as-cast and fully amorphous condition is relatively ductile, and then wind or otherwise shape the ductile ribbon on or to an hysteresis motor rotor, and then with the ribbon secured to the rotor, heat treating the ribbon and crystallizing it and thereby increasing its coercive force from the exceptionally low range of 0.01 to 0.1 oersted to the desired level in the range of 10 to 200 oersteds.

Briefly described in its article of manufacture and apparatus aspects, this invention takes the form of an hysteresis motor rotor comprising a shaft adapted to be mounted for rotation within or external to the stator of the motor with the magnetic component secured to the shaft for rotation therewith, the magnetic component consisting of a thin ribbon of crystallized amorphous metal alloy having a coercive force in the range of 10 to 200 or 300 oersteds. The motor of this invention consequently takes the form of an hysteresis motor stator and a rotor journalled for relative rotation within or external to the stator, the rotor having as its magnetic component a crystallized amorphous metal alloy in the form of a thin ribbon secured to the rotor shaft for rotation therewith.

Similarly described, this invention includes the steps of forming an amorphous metal ribbon, winding the amorphous metal ribbon upon and securing it to an hysteresis motor rotor shaft, and then heat treating the resulting rotor assembly and crystallizing the amorphous metal ribbon.

BRIEF DESCRIPTION OF THE DRAWINGS

In the drawings accompanying and forming a part of this specification.

Figure 1:
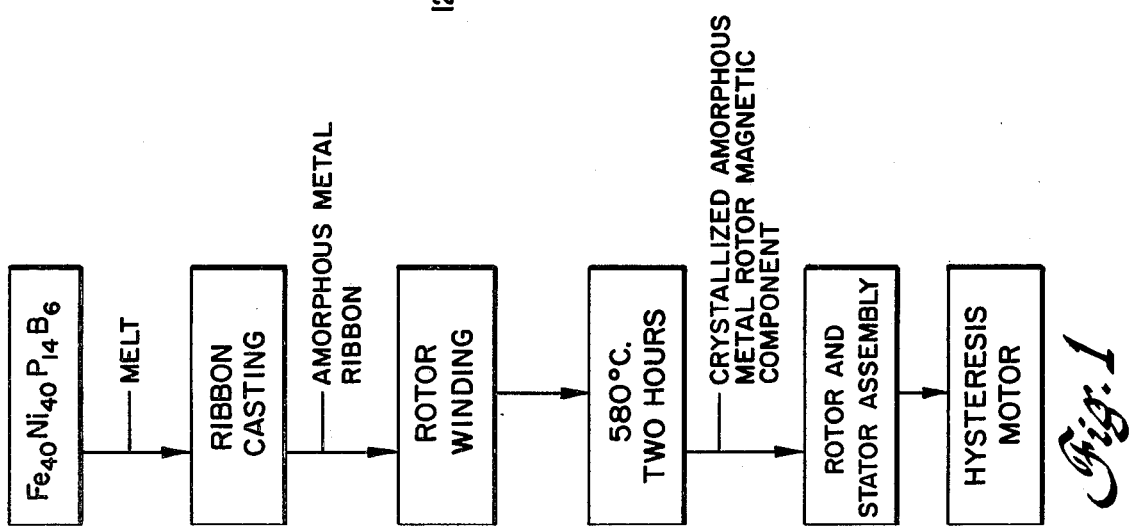
FIG. 1 is a flow diagram illustrating the sequence of the steps of the process of this invention.

As indicated in FIG. 1, a metalloid-containing magnetic alloy such as $Fe_{40}Ni_{40}P_{14}B_6$ which can be produced in glassy or amorphous form is melted and cast as a thin ribbon as the initial step in the process of this invention. This casting operation is preferably carried out as disclosed in copending patent application Ser. No. 885,436, filed Mar. 10, 1978 and now abandoned, in the name of John Lee Walter and assigned to the assignee hereof. The resulting ribbon of uniform thickness and width and of the desired length has smooth, pit-free surfaces and good ductility but very low coercive force. In this form, the ribbon can be tightly coiled and similarly shaped without tearing or breaking but lacks utility as an hysteresis motor rotor magnetic component because of its very low coercive force.

As the second step of the process, the amorphous metal ribbon still in its ductile, glassy condition is wound on an hysteresis motor rotor shaft or otherwise disposed around it or within it and is fastened (i.e. affixed) to the rotor for rotation with it within or external to a motor stator.

As the third step of the method of this invention, the thus-assembled rotor with its magnetic component is heat treated or annealed at a temperature and for a time sufficient to cause crystallization of the amorphous metal and grain growth to the extent necessary to provide the coercive force desired. Time and temperature requirements of the heat treatment will depend to some extent upon the particular amorphous magnetic alloy and also within limits one may choose between lower and higher temperatures and longer and shorter heat treatments for the same coercive force end result. In the case of the $Fe_{40}Ni_{40}P_{14}B_6$ alloy, we have found 580° C. and two hours to be optimum for this heat treatment step which is carried out, in any event, in an atmosphere which is non-reactive or neutral with respect to the metal parts being subjected to the elevated temperature condition.

At the end of this third step, the rotor is ready for assembly with the stator to provide the hysteresis motor. This assembly is suitably carried out in the usual way in conformity with hysteresis synchronous motor design principles and the motor is then ready for the intended use.

Figure 2:
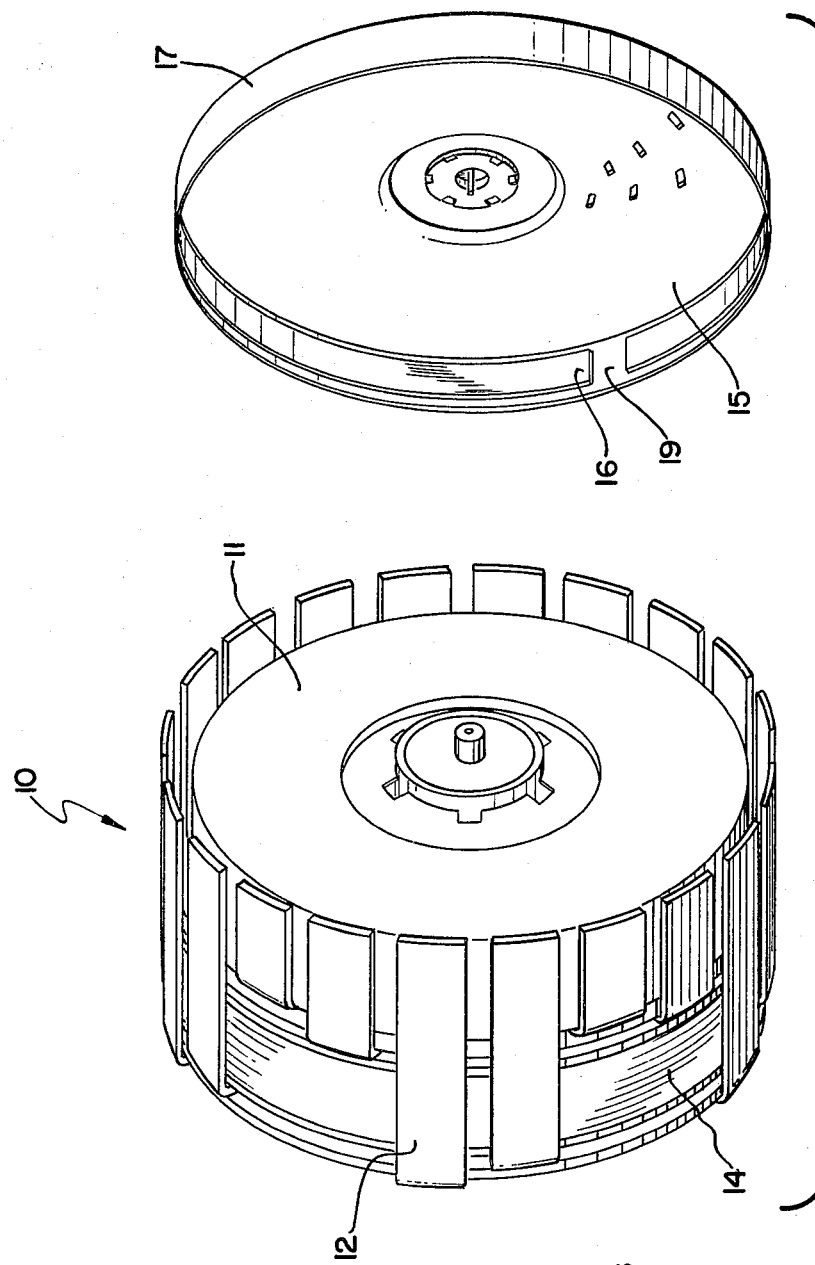
FIG. 2 is an exploded view in perspective of a fractional horsepower, hysteresis synchronous motor of the clock type embodying this invention in a preferred form.

As shown in FIG. 2, an hysteresis timing- or clock-type motor 10 includes a stator 11 comprising a stator core 12 and stator winding 14 and means (not shown) to connect winding 14 to a source of alternating electric current. An aluminum disc rotor 15 is journalled for rotation in stator 11 in response to the rotating magnetic field of the stator winding which consists of a series of consecutive north and south magnetic poles. The magnetic component of rotor 15 is a band 16 of 1.9 mil-thick ribbon of $Fe_{40}Ni_{40}P_{14}B_6$ alloy which may be produced in accordance with the method of this invention as described in detail above. Band 16 fits within rim 17 of disc-like rotor 15, the ends of the band defining a short gap 19 between them and the band being held in place for rotation with rotor 15 by adhesive material in thin layer form (not shown). Gap 19 is not a feature of this invention and has no significant effect upon motor performance.

The following illustrative, but not limiting, examples of the practice of this invention will serve to further define the invention in its presently preferred embodiments:

EXAMPLE I

Figure 3:
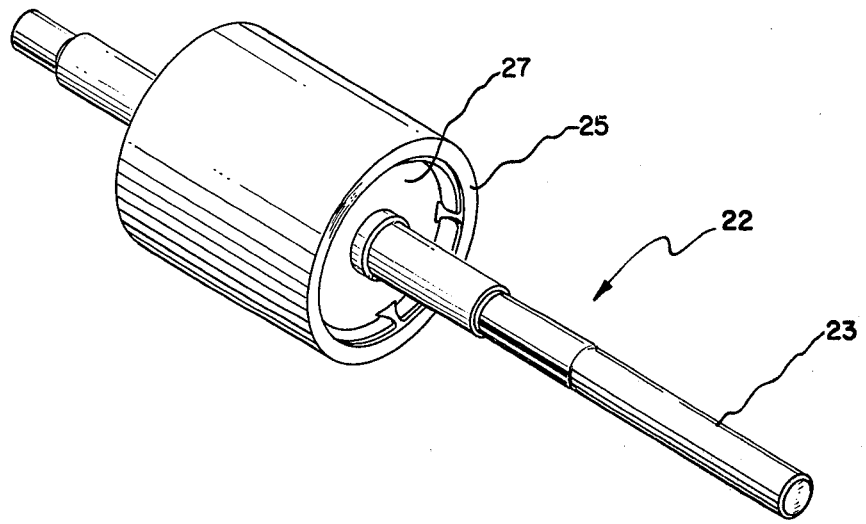
FIG. 3 is a perspective view of a rotor embodying this invention in another preferred form for use in a one-hundredth horsepower hysteresis motor; and, FIG. 4 is a chart on which coercive force in oersteds is plotted against annealing temperature, the three curves representing data developed in experiments to be described involving two-hour heat treatments of three different amorphous metal alloys.

Rotor 22 shown in FIG. 3 consists of a steel shaft 23 and a magnetic component in the form of a tightly wound coil 25 (of 50 turns) of amorphous ribbon 1.9 mil thick of $Fe_{40}Ni_{40}P_{14}B_6$ (produced as described above in reference to FIG. 2) supported on and secured to shaft 23 by four brass discs 27 (one shown) uniformly spaced axially and together defining an open cylinder, being friction-fitted to the shaft and thus maintained in fixed position.

A duplicate of rotor 22 annealed at 580° C. for two hours was assembled with a one-hundredth horsepower hysteresis motor stator which was then operated on power input of 44 watts (current of 0.42 amperes and voltage of 110 volts at 60 Hertz). Motor speed was 1800 revolutions per minute and torque was 0.225 ounce-foot. The crystallized amorphous $Fe_{40}Ni_{40}P_{14}B_6$ alloy had a saturation magnetization of 8000 gauss and coercive force of 50 oersteds. Since this was a demonstration device, the performance was not equal to the original motor design.

EXAMPLE II

The effect on the coercive force of annealing at various temperatures for two hours was tested in reference to band 16 and coil 25 by using a single strip of the $Fe_{40}Ni_{40}P_{14}B_6$ alloy 1.9 mil-thick produced as described in reference to FIG. 2 and heat treated at increasing temperatures. The results of the coercive force measurements made on the resulting fully crystallized test strip are shown as points on Curve A of FIG. 4.

EXAMPLE III

An experiment like that of Example II was carried out on a strip of $Fe_{40}Ni_{40}B_{20}$ alloy ribbon 1.9 mil-thick produced as described in reference to FIG. 2. Coercive force measurement results of tests made on the strip are represented as points on Curve B of FIG. 4.

EXAMPLE IV

Figure 4:
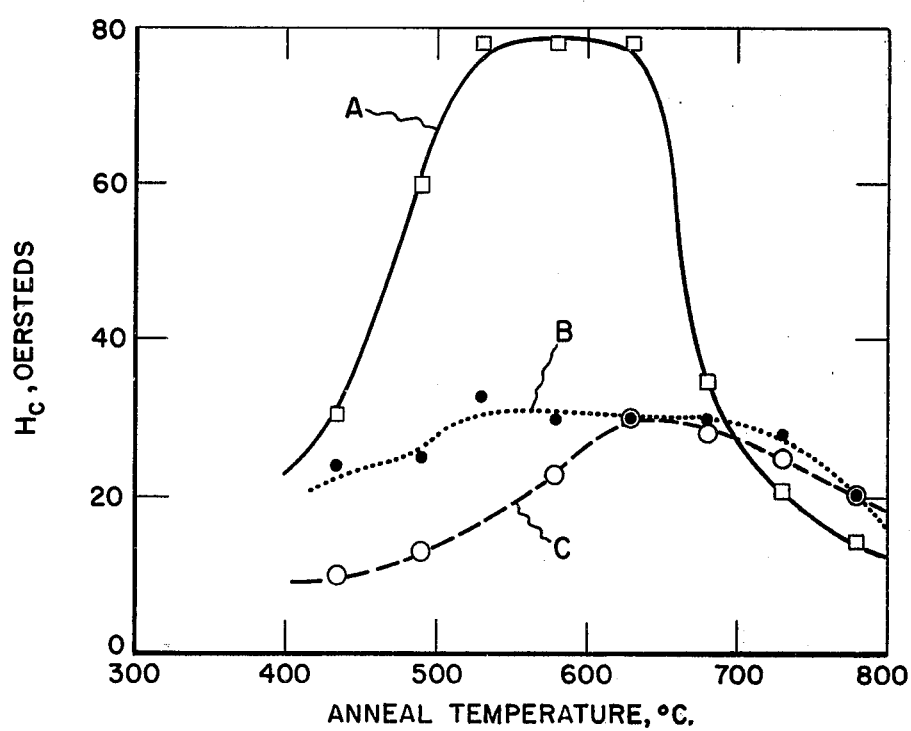

Still another experiment like that of Examples II and III was carried out to test the effect of annealing for two hours at various temperatures on $Fe_{82}B_{18}$ alloy in the same amorphous ribbon form with the results indicated as points on Curve C of FIG. 4. Again, the test strip was prepared as described in reference to FIG. 2 and was the same as those of Examples II and III but for composition.

In Examples II, III and IV the annealed test strips were all observed to be fully crystallized. The difference in the value of the coercive force at the peak may be attributed to the different crystalline phases likely to develop from the different alloy compositions during their grain growth from fine grain sizes to optimum grain size to very large grain size as the coercive force increases to a maximum and then decreases.

Those skilled in the art will understand that this invention is applicable (with the new results described above) to magnetic metals and alloys which can be produced in solid amorphous state. In addition to the alloys specified above, iron-cobalt-nickel $(Fe_xCo_yNi_z)_{100-W}G_W$ where $10 < W < 30$ alloys and others like them in that they have magnetic characteristics and can be produced in glassy or amorphous form because of their glass-forming elements (G = SI, P, B, C, Ge, Al, etc., and mixtures of them) can be used to advantage in accordance with this invention.

What we claim as new and desire to secure by Letters Patent of the United States is:

1. The method of making a hysteresis motor rotor assembly having a predetermined hysteresis loop area, which comprises the steps of
    casting a magnetic alloy composition in the form of a ductile amorphous metal ribbon having a value of coercive force in the range of from about 0.01 to about 0.1 oersted,
    tightly winding said ductile ribbon on a rotor member,
    affixing the wound ribbon to said rotor member to form a rotor assembly,
    preselecting a value of coercive force in the range of from about 10 to about 300 oersteds to be provided to said wound ribbon,
    heating said rotor assembly to a preselected temperature above the crystallization temperature for said magnetic alloy composition, and
    maintaining said rotor assembly at said preselected temperature for a period of time at least sufficient to develop said preselected coercive force in said wound ribbon.

2. The method of claim 1 in which the composition of the amorphous metal is $Fe_{40}Ni_{40}P_{14}B_6$.

3. The method of claim 1 wherein the magnetic alloy composition is free of cobalt.

4. The method of claim 1 wherein the magnetic alloy composition is $Fe_{40}Ni_{40}B_{20}$.

5. The method of claim 1 wherein the magnetic alloy composition is $Fe_{80}B_{20}$.

* * * * *